(12) United States Patent
Yebka et al.

(10) Patent No.: US 8,535,819 B2
(45) Date of Patent: Sep. 17, 2013

(54) INTERNALLY NEUTRALIZING A POWER SOURCE

(75) Inventors: Bouziane Yebka, Apex, NC (US); Joseph Anthony Holung, Wake Forest, NC (US); Tin-Lup Wong, Chapel Hill, NC (US); Kenneth Scott Seethaler, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 81 days.

(21) Appl. No.: 12/715,630

(22) Filed: Mar. 2, 2010

(65) Prior Publication Data

US 2011/0217582 A1 Sep. 8, 2011

(51) Int. Cl.
*H01M 2/16* (2006.01)
*H01M 2/34* (2006.01)
*H01M 10/056* (2010.01)

(52) U.S. Cl.
USPC ............ 429/62; 429/142; 429/188; 429/249; 429/251

(58) Field of Classification Search
None
See application file for complete search history.

(56) References Cited

U.S. PATENT DOCUMENTS

| | | | |
|---|---|---|---|
| 6,210,840 B1 | 4/2001 | Usami et al. | 429/325 |
| 6,228,516 B1 * | 5/2001 | Denton et al. | 429/7 |
| 6,455,200 B1 | 9/2002 | Prakash et al. | 429/231.95 |
| 6,746,794 B2 | 6/2004 | Mandal et al. | 429/62 |
| 7,419,743 B2 | 9/2008 | Fujikawa et al. | 429/130 |
| 8,273,474 B2 | 9/2012 | Al-Hallaj et al. | |
| 2002/0045091 A1 | 4/2002 | Kamei et al. | 429/62 |
| 2006/0286378 A1 * | 12/2006 | Chiruvolu et al. | 428/402 |
| 2007/0018141 A1 * | 1/2007 | Kepler et al. | 252/500 |
| 2008/0254355 A1 * | 10/2008 | Muraoka et al. | 429/129 |
| 2009/0092900 A1 | 4/2009 | Obana et al. | 429/223 |
| 2010/0247987 A1 * | 9/2010 | Holung et al. | 429/62 |

FOREIGN PATENT DOCUMENTS

| | | |
|---|---|---|
| CN | 101286576 | 10/2008 |
| CN | 101501891 | 8/2009 |
| DE | 4409268 | 6/1995 |
| DE | 10328862 | 1/2005 |
| JP | 2003-036888 | 2/2003 |
| JP | 2004-051791 | * 2/2004 |

* cited by examiner

*Primary Examiner* — Jonathan Crepeau
(74) *Attorney, Agent, or Firm* — John L. Rogitz

(57) ABSTRACT

A battery is disclosed that includes two contact areas, an electrolyte, and an electronically conductive material that, at a neutralization trip point temperature, increases electronic conductivity internal to the battery between the first contact area and the second contact area. In one embodiment, the electronically conductive material is void from being activated external to the battery. In another embodiment, the battery includes a semiconductor material that includes custom doping to provide the increased electron conductivity at the neutralization trip point temperature. In yet another embodiment, the battery includes an insulator for separating the electronically conductive material until a temperature internal to the battery reaches the neutralization trip point temperature, at which point permits the electronically conductive material to increase the electronic conductivity between the first contact area and the second contact area.

19 Claims, 8 Drawing Sheets

INTERNALLY NEUTRALIZING A POWER SOURCE

TECHNICAL FIELD

Subject matter disclosed herein relates to internally neutralizing a power source, and more particularly relates to automatically increasing a battery's internal electronic conductivity when the battery's internal temperature reaches a particular trip point temperature.

BACKGROUND

Batteries are used extensively in notebook computers, cell phones, tools, transportation vehicles (e.g., electric cars, trains, buses, etc.), and other systems that depend upon an electrical source to function. Rechargeable batteries, such as lithium-ion batteries, may be the battery of choice due to their relative low cost and high energy storage capability.

A battery uses chemical energy (internal ion transfer) to perform electrical work (external electron transfer). A battery includes two external contact areas (anode and cathode) and an electrolyte. The anode is negatively charged relative to the cathode and, by connecting the anode and cathode to an electronic load, the battery provides power to the electronic load by passing electrons from the anode to the load and back to the cathode. The electrolyte is an ion conductor and an electron insulator. Meaning, the electrolyte passes ions between the anode and cathode, but suppresses electron flow between the anode and cathode. As the battery passes electrons to the electron load (discharges) through its external contacts, the electrolyte passes ions from the anode to the cathode internal to the battery.

SUMMARY

A battery is disclosed that includes two contact areas, an electrolyte, and an electronically conductive material that, at a neutralization trip point temperature, increases electronic conductivity internal to the battery between the first contact area and the second contact area. In one embodiment, the electronically conductive material is void from being activated external to the battery. In another embodiment, the battery includes a semiconductor material that includes custom doping to provide the increased electron conductivity at the neutralization trip point temperature. In yet another embodiment, the battery includes an insulator for separating the electronically conductive material until a temperature internal to the battery reaches the neutralization trip point temperature, at which point permits the electronically conductive material to increase the electronic conductivity between the first contact area and the second contact area.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of embodiments of the present disclosure, as defined solely by the claims, will become apparent in the non-limiting detailed description set forth below.

BRIEF DESCRIPTION OF THE DRAWINGS

Features and advantages of the described implementations can be more readily understood by reference to the following description taken in conjunction with the accompanying drawings, wherein.

DETAILED DESCRIPTION

Figure 1:
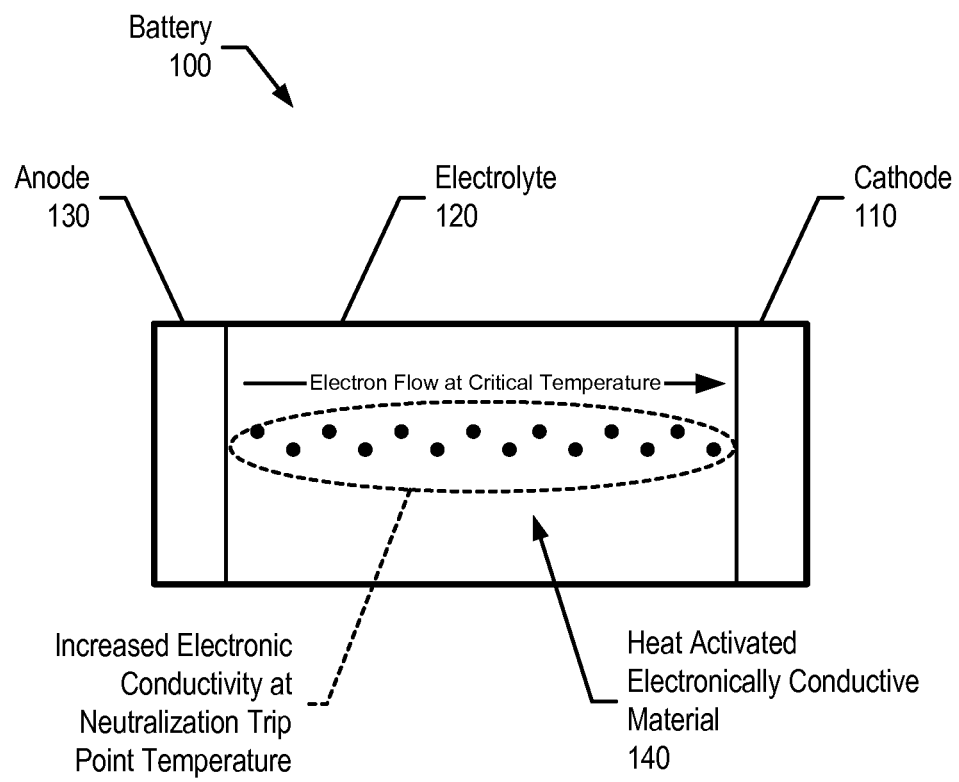
FIG. 1 is a diagram showing a battery that includes a heat activated electronically conducting material.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Aspects of the present disclosure are described below with reference to flowchart illustrations and/or block diagrams of methods, apparatus (systems) and computer program products according to embodiments of the disclosure. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing a battery that includes a heat activated electronically conducting material. Battery 100 includes two external contact areas, which are cathode 110 and anode 130. For example, cathode 110 may be the "positive" side of battery 100 and anode 130 may be the "negative" side of battery 100. In one embodiment, both cathode 110 and anode 130 have high ionic conductivity and high electronic conductivity.

Battery 100 also includes electrolyte 120, which has high ionic conductivity and is void of electronic conductivity. Electrolyte 120 may be a liquid, gel or in solid state, which allows ions (M+) and prevents electrons to move from anode 130 to cathode 110. For example, electrolyte 120 may include electrolytic material such as lithium salts (e.g., $LiPF_6$, $LiBF_4$ or $LiClO_4$) in an organic solvent, such as ethylene carbonate.

Situations arise when battery 100 develops a small internal short. The small internal short may create localized heat, which may lead to battery 100 overheating and thermal runaway. During cell malfunction or heat exposure, the risk of thermal runaway or explosion is proportional to the voltage potential difference between cathode 110 and anode 130. To minimize or eliminate the risk of thermal runaway or explosion, electrolyte 120 includes heat activated electronically conductive material 140. Heat activated electronically conductive material 140 increases electron conductivity between anode 130 and cathode 110 at a "neutralization trip point temperature," thereby significantly reducing the voltage potential between cathode 110 and anode 130 (see FIGS. 2-4 and corresponding text for further details). The neutralization trip point temperature is a specifically designated temperature that indicates when battery 100 is experiencing thermal runaway. Heat activated electronically conductive material 140 may comprise, for example, a custom doped semiconductor or an inert material that combines with an electrolyte material to create a combination material that is electronically conductive (see FIGS. 6-7 and corresponding text for further details).

Figure 2:
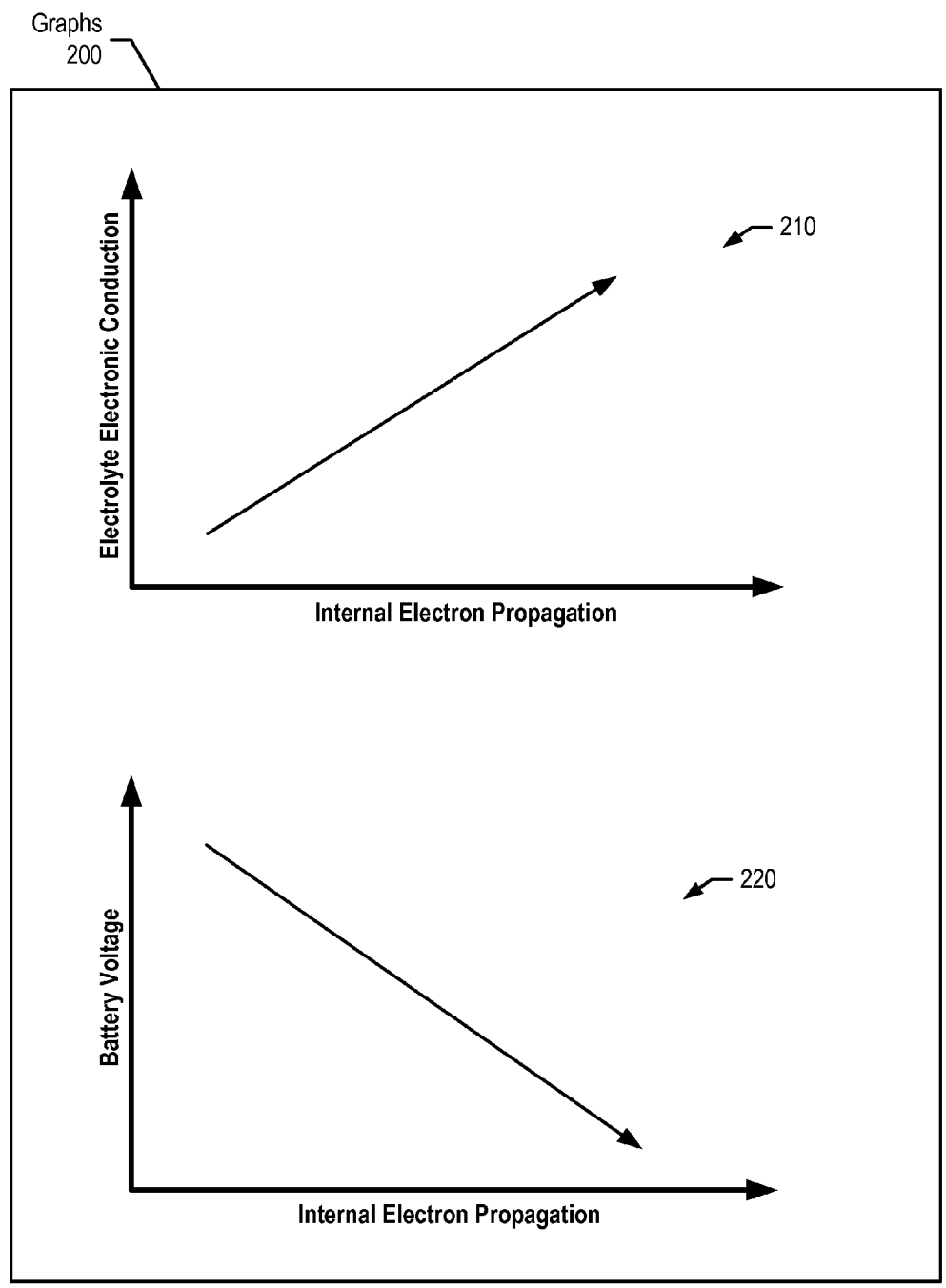
FIG. 2 is a graphical diagram showing relationships between electrolyte electron conduction, internal electron propagation, and battery voltage.

FIG. 2 is a graphical diagram showing relationships between electrolyte electron conduction, internal electron propagation, and battery voltage. Graphs 200 include graph 210 and graph 220. Graph 210 shows that as an electrolyte's electron conductivity increases (y-axis), the internal electron propagation between the anode and cathode increases (x-axis). And, as graph 220 shows, as the internal electron propagation between the anode and cathode increases (x-axis), the battery voltage decreases (y-axis). This is due to the fact that as electrons migrate from the battery's anode to the cathode, the voltage potential difference between the anode and cathode decreases. In short, by increasing the electrolyte's electronic conductivity, the battery's voltage potential decreases and neutralizes the battery, therefore minimizing thermal runaway (see FIG. 4 and corresponding text for further details).

Figure 3:
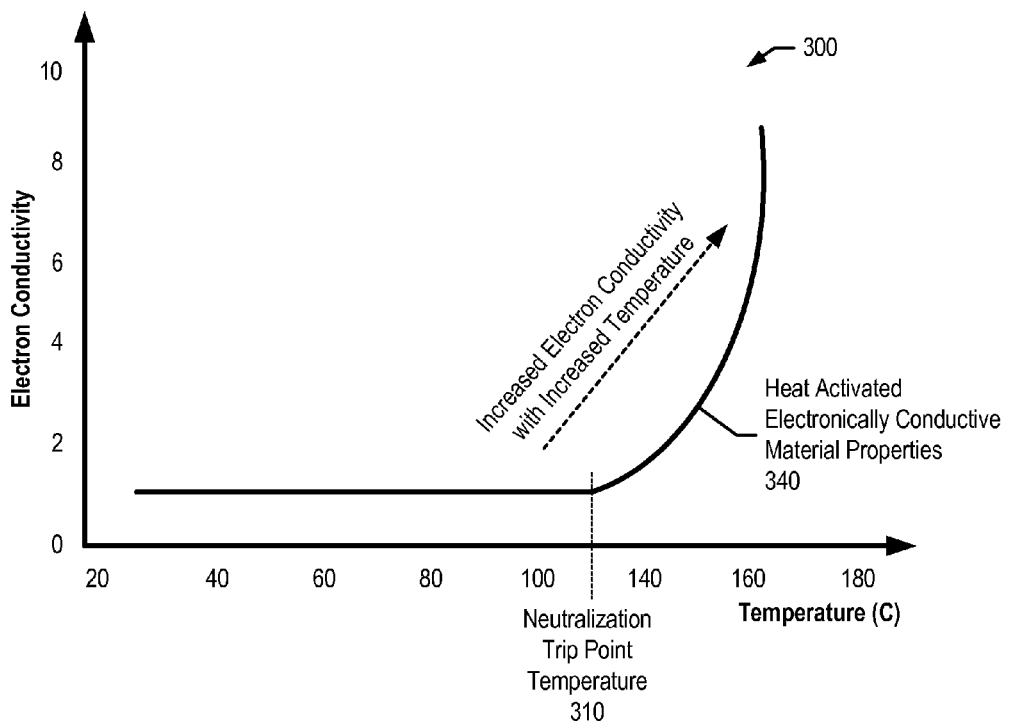
FIG. 3 is a diagram showing a battery's heat activated electronically conductive material increasing in electron conductivity after the battery's internal temperature reaches a particular neutralization trip point temperature.

FIG. 3 is a diagram showing a battery's heat activated electronically conductive material increasing in electron conductivity after the battery's internal temperature reaches a particular neutralization trip point temperature. Graph 300 shows a relationship between electron conductivity and temperature for a heat activated electronically conductive material (heat activated electronically conductive material properties 340). As can be seen, the material is relatively electron non-conductive up until neutralization trip point temperature 310. As such, during normal operation, a battery's electrolyte functions normally by suppressing electron flow between the battery's anode and cathode, while permitting ion flow between the battery's anode and cathode.

At neutralization trip point temperature 310, the heat activated electronically conductive material increases in electron conductivity. In turn, the voltage potential between the battery's anode and cathode decrease and the battery neutralizes (see FIG. 4 and corresponding text for further details).

Figure 4:
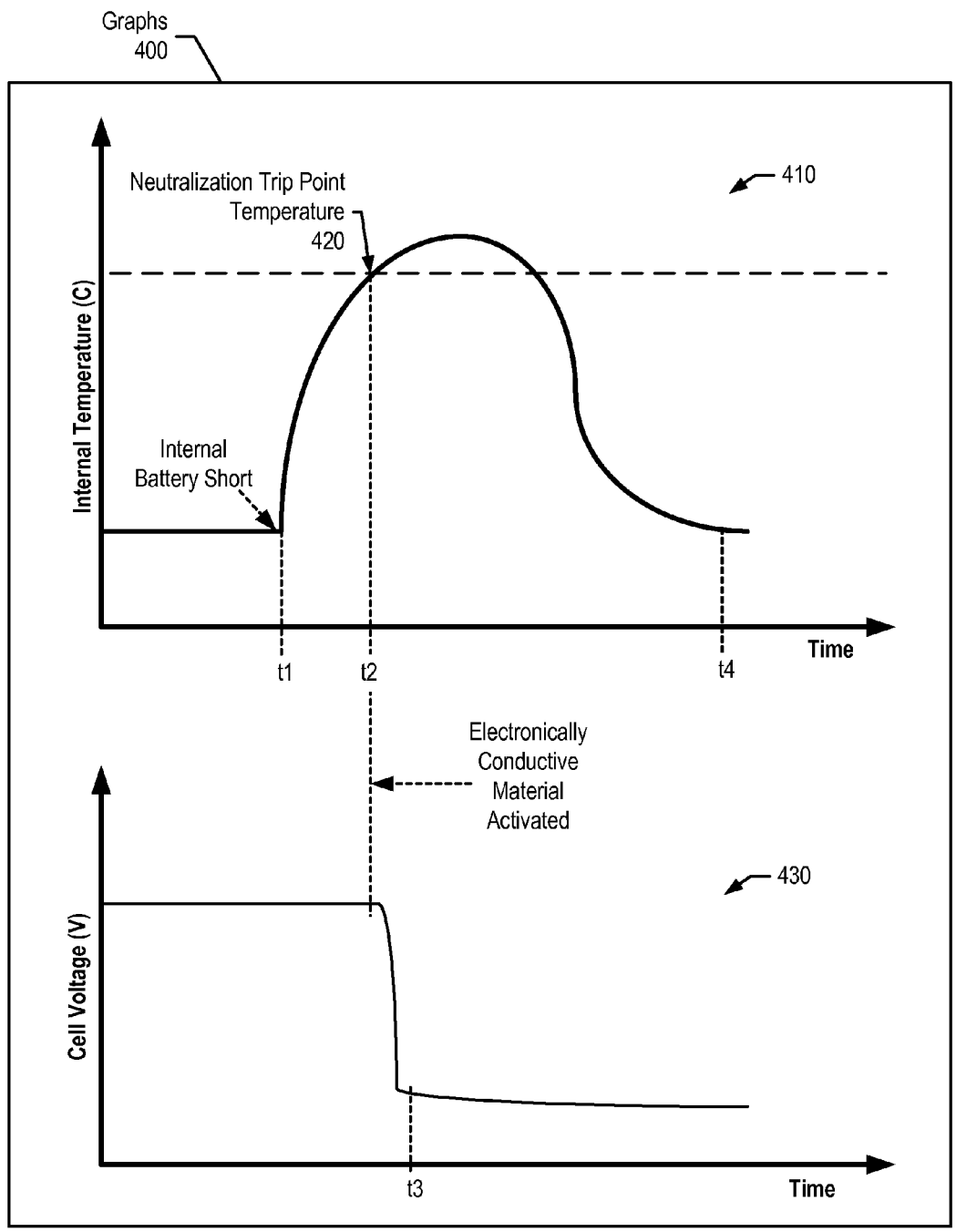
FIG. 4 is a graphical representation of a battery neutralizing itself after commencing a thermal runaway condition.

FIG. 4 is a graphical representation of a battery neutralizing itself after commencing a thermal runaway condition. Graphs 400 include graph 410 and graph 430. Graph 410 shows a battery's temperature at various points in time. At time t1, the battery develops an internal battery short. For example, the battery may have been damaged, or the battery may include defective material. As discussed previously, a low electrical resistance may trigger a localized heat condition and result in thermal runaway. The internal battery short causes the low electrical resistance and, as graph 410 illustrates, causes the battery's internal temperature to increase.

The battery's internal temperature continues to increase, and eventually reaches neutralization trip point temperature 420 at time t2. At this point, the battery's electronically conductive material in the electrolyte activates and causes the electrolyte to become electronically conductive. As the battery's electrolyte becomes more conductive and electrons migrate from the battery's anode to cathode, the battery's voltage potential decreases (shown in graph 430). At time t3, the battery is neutralized (little to no voltage potential between the anode and cathode), which causes the battery's temperature to drop and eventually decrease to nominal levels at time t4 (graph 410).

Figure 5:
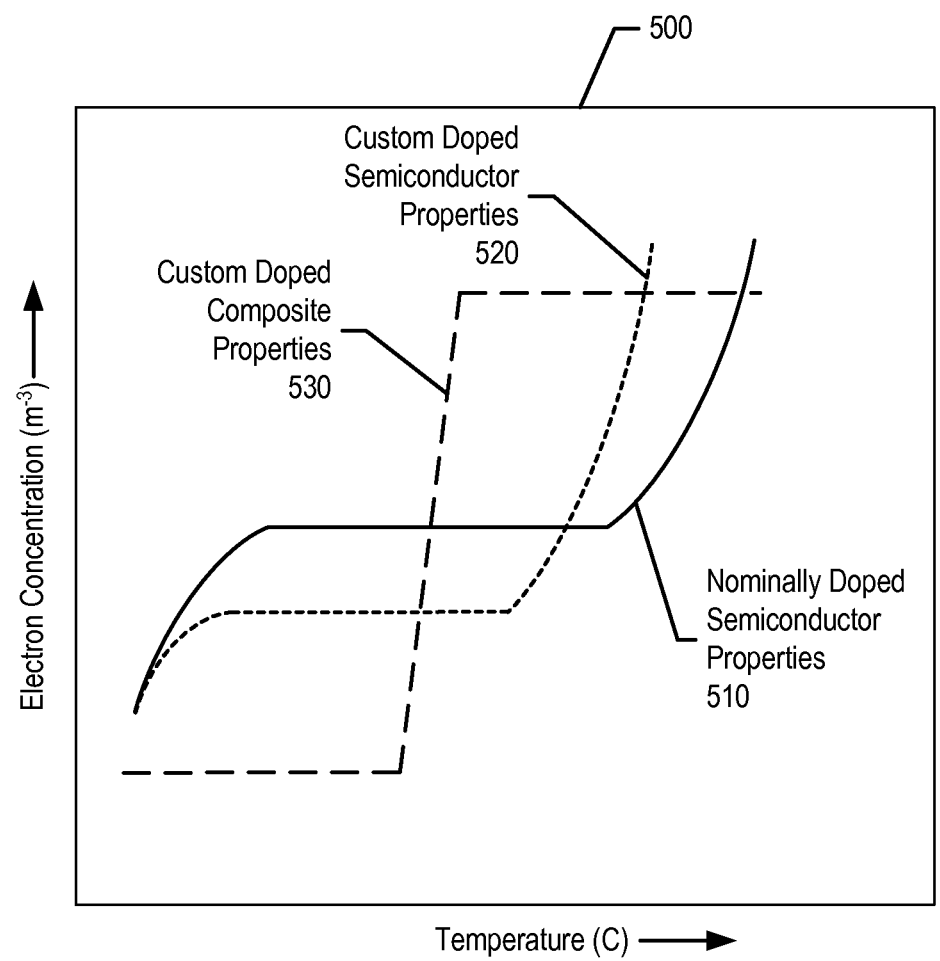
FIG. 5 is a diagram showing custom doped semiconductor properties compared with nominally doped semiconductor properties.

FIG. 5 is a diagram showing custom doped semiconductor properties compared with nominally doped semiconductor properties. One embodiment to increase electron conductivity through a battery's electrolyte is to use a custom doped semiconductor or a custom doped composite material that includes, for example, a heat activated material that starts with insulator properties and transitions to electronically conductive properties. Compared with a nominally doped semiconductor, such as that used for integrated circuits, custom doped semiconductors or custom doped composites are designed to have a lower temperature "trigger point" when they become electronically conductive.

When a typical semiconductor is heated, the heat energy knocks loose some of the semiconductor's electrons. These loose electrons may move through the semiconductor easily (higher electron conductivity). As more heat energy is added, more electrons break away from individual atoms, becoming free to move through the semiconductor.

Typically, a nominally doped semiconductor is designed (doped) to not change in electron conductivity over a wide temperature range in order for an electronic device to function properly over the temperature range. As graph 500 shows, nominally doped semiconductor properties line 510 shows that nominally doped semiconductors begin to conduct electrons at high temperatures. Custom doped semiconductor properties line 520, however, shows that the temperature at which a custom doped semiconductor begins to conduct electrons is at a much lower temperature (in addition to having controlled initial electronic concentration). As such, a semiconductor may be custom doped in order shift the semiconductor's electron conductivity properties to a temperature corresponding to battery's thermal runaway critical temperature, or neutralization trip point temperature. Examples of material used for custom doped semiconductors include silicon, poly(3-hexylthiophene), poly(p-phenylene vinylene) (PPV), as well as polyacetylene and its derivatives.

FIG. 5 also shows custom doped composite properties line 530 that shows a custom doped composite material starting with insulator properties and transitioning to electronically conductive properties. In one embodiment, custom doped composite material may include an insulator and electronically conducting material (e.g., metal). In this embodiment, the insulator may be designed to melt at the neutralization trip point temperature and cause the electronically conducing material to touch, thereby causing multiple shorts internal to the battery. In another embodiment, a composite doped composite material may include an organic conjugated polymer, such as Poly(p-phenylene) (PPP). In this embodiment, the material's transitioning points from insulator, semiconductor, or electron conductor may be adjusted by adjusting the doping levels of Lithium (Li) or Potassium (K).

Figure 6A:
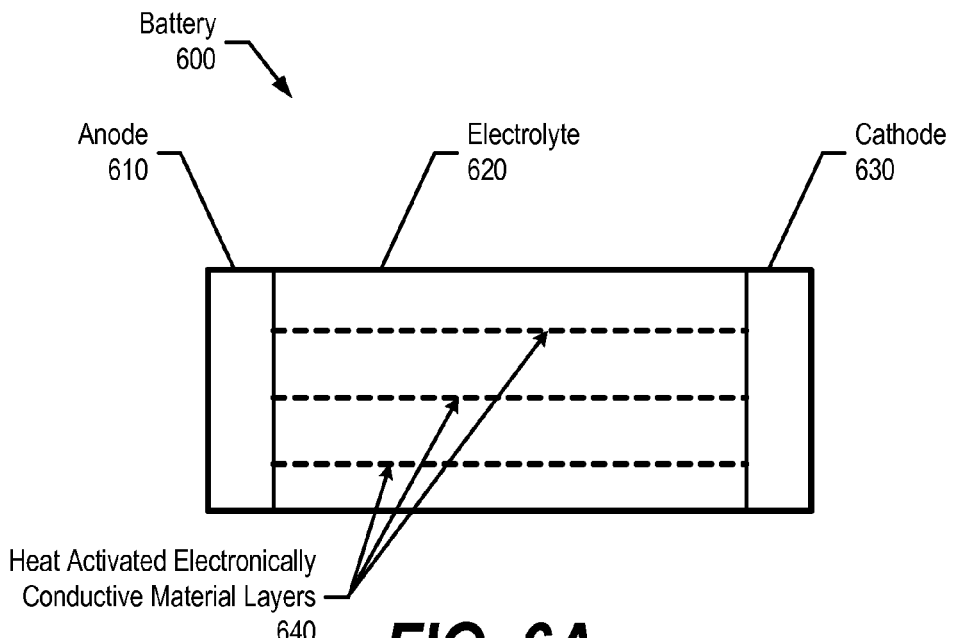
FIG. 6A is a diagram showing a battery's electrolyte including heat activated electronically conductive material layers.

FIG. 6A is a diagram showing a battery's electrolyte including heat activated electronically conductive material layers. One embodiment to internally neutralize a battery is to add "layers" in the battery or modify existing ceramic protective layers. Battery 600 includes anode 610, electrolyte 620, cathode 630, and heat activated electronically conductive material layers 640. These layers may be applied to anode 610, cathode 630, on one or both sides of a separator in electrolyte 620, or a combination thereof, depending on a particular battery's construction.

For example, in one embodiment, layers 640 may be made of a custom doped semiconductor material with heat-activated electronic conductivity, which has a precise electron conductivity transition temperature specifically to coincide with a desired neutralization trip point temperature. When the temperature of battery 600 increases to the specially engineered threshold, the heat activated conductive layer transitions to a high electron conductivity state, permitting the flow of electrons internally from anode 610 to the cathode 630 through layers 640.

Figure 6B:
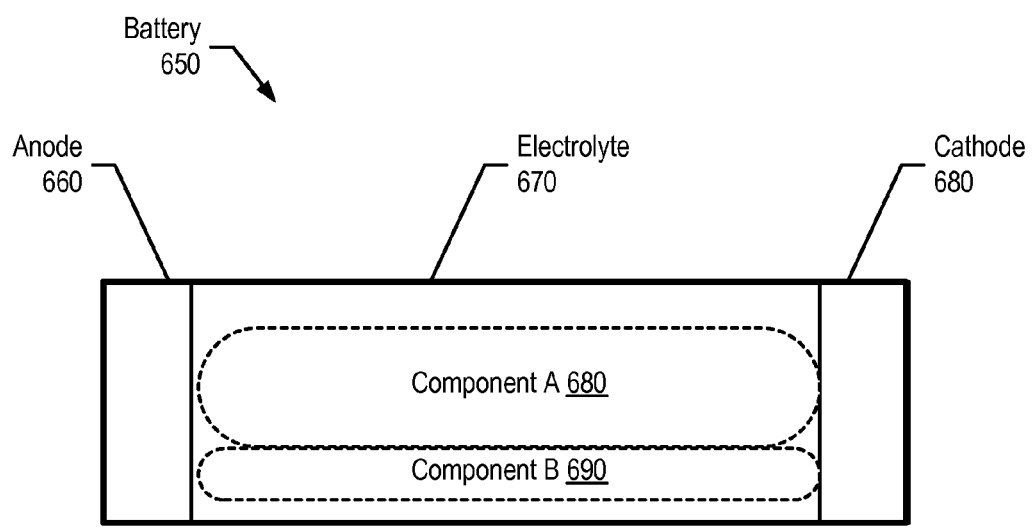
FIG. 6B is a diagram showing an electrolyte including electrolyte material and electronically non-conductive material that, when combined together, creates an electronically conductive material.

FIG. 6B is a diagram showing an electrolyte including electrolyte material and electronically non-conductive material that, when combined together, creates an electronically conductive material. In this embodiment, battery 650 neutralizes when component A 680 combines with component B 690 to create an electronically conductive combination material. In this embodiment, component A 680 may be an existing electrolyte material, additive or controlled impurities. Component B 690 may be an otherwise inert additive that is compatible with the constituents of an electrolyte solution at normal cell temperatures, but becomes reactive at a desired neutralization trip point temperature and reacts with component A 680 to form a byproduct combination material C with high electronic conductivity. Since combination material C has high electronic conductivity, electrons flow from anode 660 to cathode 680 through electrolyte 670 to neutralize battery 650.

In one embodiment, instead of two separate components A 680 and B 690, electrolyte 670 may include a heat activated electronically conductive polymer/solid material (or chemicals that are embedded within the material) that is electronically non-conductive at temperatures lower than the neutralization trip point temperature, and become electronically conductive at and above the neutralization trip point temperature.

Figure 7:
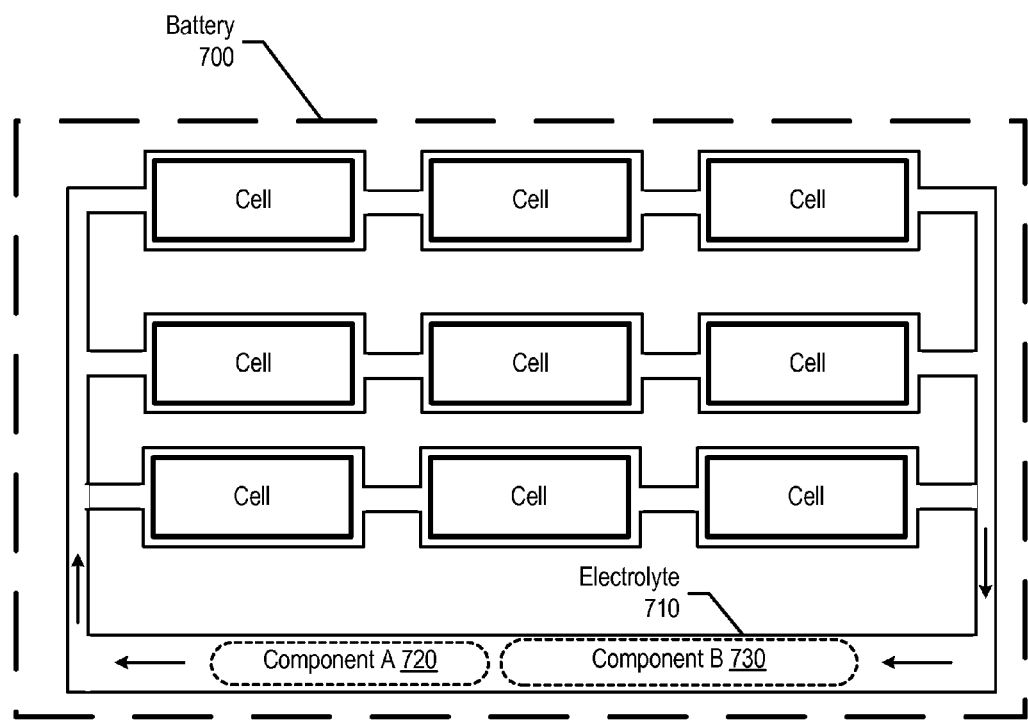
FIG. 7 is a diagram of a multi-cell battery embodiment that includes common electrolyte material and a heat activated electronically conductive material.

FIG. 7 is a diagram of a multi-cell battery embodiment that includes common electrolyte material and a heat activated electronically conductive material. Battery 700 includes multiple cells (e.g., an automotive battery), and electrolyte 710 that includes component A 720 and component B 730. As discussed in FIG. 6B, component A 720 may be an existing electrolyte material, additive or controlled impurities and component B 730 may be an otherwise inert additive that is compatible with the constituents of an electrolyte solution at normal cell temperatures, but becomes reactive at a desired neutralization trip point temperature to react with component A 680 and forms a byproduct combination material C with high electronic conductivity.

In one embodiment, some of the battery 700's cells may be coupled to an external anode contact area and other cells may be coupled to an external cathode contact area. When battery 700 reaches a neutralization trip point temperature, component B 730 combines with component A 720 to create an electronically conductive combination material. In turn, the combination material increases electron conductivity between the "anode" cells and the "cathode" cells, thereby neutralizing battery 700. In another embodiment, component B 730 may be contained within a skin that is designed to dissolve at the neutralization trip point temperature.

In yet another embodiment, electrolyte 710 may include a heat activated electronic conducting polymer/solid (or chemicals that are embedded within the material) such that they are electronically non-conductive at temperatures lower than the neutralization trip point temperature, and becomes electronically conductive at and above the neutralization trip point temperature.

Figure 8A:
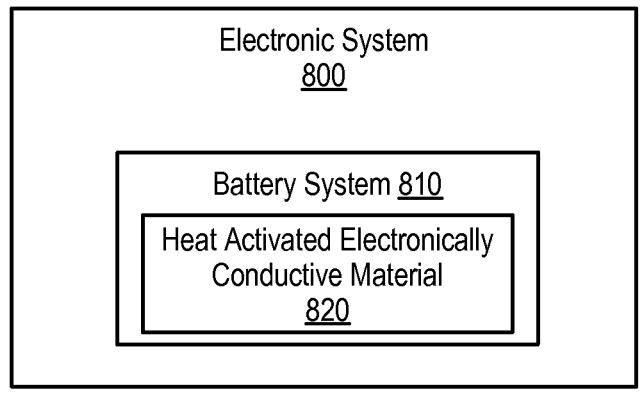
FIG. 8A is a diagram showing an electronic system utilizing a battery system with neutralization capabilities as discussed herein.

FIG. 8A is a diagram showing an electronic system utilizing a battery system with neutralization capabilities as discussed herein. Electronic system 800 may be, for example, a computer system, a cell phone, a medical device, an electronic toy, and etcetera. Battery system 810 includes a battery (anode, cathode, electrolyte), and heat activated electronically conductive material 820. When the battery's internal temperature reaches a neutralization trip point temperature, heat activated electronically conductive material 820 causes electrons to flow internally between the battery's anode and cathode, thereby neutralizing the battery and preventing thermal runaway.

Figure 8B:
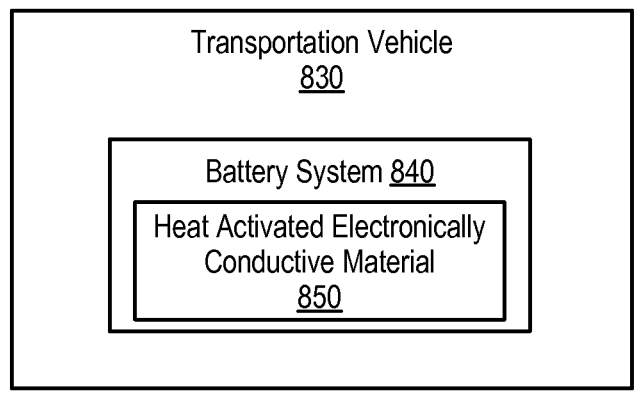
FIG. 8B is a diagram showing a transportation vehicle utilizing a battery system with neutralization capabilities as discussed herein.

FIG. 8B is a diagram showing a transportation vehicle utilizing a battery system with neutralization capabilities as discussed herein. Transportation vehicle 830 may be, for example, an electric car, an electric bus, a commuter rail system with backup power capability, and etcetera. Battery system 840 may include a bank of batteries and heat activated electronically conductive material 850. As discussed above, when the battery's internal temperature reaches a neutralization trip point temperature, heat activated electronically conductive material 850 causes electrons to flow internally between the battery's anode and cathode, thereby neutralizing battery system 840 and preventing thermal runaway.

The block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A system comprising:
    a battery comprising:
        a first contact area and a second contact area, wherein the first contact area is negatively charged relative to the second contact area;
        an electrolyte that couples to the first contact area and the second contact area, wherein the electrolyte suppresses electron flow internal to the battery between the first contact area and the second contact area and enables ionic flow internal to the battery between the first contact area and the second contact area; and
        an electronically conductive material that transitions from exhibiting insulator properties to creating a plurality of shorts between the first contact area and the second contact area at a neutralization trip point temperature corresponding to a thermal runaway critical temperature of the battery, wherein the plurality of shorts reduces a charge difference between the first contact area and the second contact area.

2. The system of claim 1 wherein the electronically conductive material is void from being activated external to the battery.

3. The system of claim 1 wherein the electronically conductive material further comprises:
    a semiconductor material that provides the increased electron conductivity at the neutralization trip point temperature.

4. The system of claim 1 wherein the battery further comprises:
    an insulator for separating the electronically conductive material until a temperature internal to the battery reaches the neutralization trip point temperature, and at which point permits the electronically conductive material to increase the electronic conductivity internal to the battery between the first contact area and the second contact area.

5. The system of claim 1 wherein the electronically conductive material creates a plurality of shorts between the first contact area and the second contact area, the plurality of shorts increasing electron conductivity between the first contact area and the second contact area.

6. The system of claim 1 wherein the battery comprises a plurality of cells and the electronically conductive material resides within the plurality of cells.

7. The system of claim 1 wherein the electronically conductive material comprises a composite material.

8. A system comprising:
    one or more system components that consume power; and
    a battery that provides power to the one or more system components, wherein the battery comprises:
        a first contact area and a second contact area, wherein the first contact area is negatively charged relative to the second contact area;
        an electrolyte that couples to the first contact area and the second contact area, wherein the electrolyte suppresses electron flow internal to the battery between the first contact area and the second contact area and enables ionic flow internal to the battery between the first contact area and the second contact area; and
        an electronically conductive material that transitions from exhibiting insulator properties to creating a plurality of shorts between the first contact area and the second contact area at a neutralization trip point temperature corresponding to a thermal runaway critical temperature of the battery, wherein the plurality of shorts reduces a charge difference between the first contact area and the second contact area.

9. The system of claim 8 wherein the one or more system components further comprise:
    one or more processors;
    a memory accessible by at least one of the processors; and
    a nonvolatile storage area accessible by at least one of the processors.

10. The system of claim 8 wherein the one or more system components comprise a motor included in a transportation vehicle, wherein the motor receives power from the battery in order to propel the vehicle.

11. The system of claim 8 wherein the electronically conductive material further comprises:
    a semiconductor material that provides the increased electron conductivity at the neutralization trip point temperature.

12. The system of claim 8 wherein the battery further comprises:
    an insulator for separating the electronically conductive material until a temperature internal to the battery reaches the neutralization trip point temperature, at which point permits the electronically conductive material to increase the electronic conductivity internal to the battery between the first contact area and the second contact area.

13. The system of claim 8 wherein the battery comprises a plurality of cells and the electronically conductivity material resides within the plurality of cells.

14. The system of claim 8 wherein the electronically conductive material comprises a composite material that exhibits insulator properties until a temperature internal to the battery reaches the neutralization trip point temperature, at which point transitions to exhibit electronically conductive properties.

15. A method for producing a battery, the method comprising:
including a first contact area and a second contact area in the battery, wherein the first contact area is negatively charged relative to the second contact area;
including an electrolyte in the battery that couples to the first contact area and the second contact area, wherein the electrolyte suppresses electron flow internal to the battery between the first contact area and the second contact area and enables ionic flow internal to the battery between the first contact area and the second contact area; and
including an electronically conductive material that transitions from exhibiting insulator properties to creating a plurality of shorts between the first contact area and the second contact area at a neutralization trip point temperature corresponding to a thermal runaway critical temperature of the battery, wherein the plurality of shorts reduces a charge difference between the first contact area and the second contact area.

16. The method of claim 15 further comprising:
including a semiconductor material in the battery that provides the increased electron conductivity at the neutralization trip point temperature.

17. The method of claim 15 further comprising:
including an insulator in the battery for separating the electronically conductive material until a temperature internal to the battery reaches the neutralization trip point temperature, and at which point permits the electronically conductive material to increase the electronic conductivity internal to the battery between the first contact area and the second contact area.

18. The method of claim 15 wherein the battery comprises a plurality of cells and the electronically conductive material resides within the plurality of cells.

19. The method of claim 15 wherein the electronically conductive material comprises a composite material.

\* \* \* \* \*